United States Patent
Hoisington et al.

(10) Patent No.: US 6,547,181 B1
(45) Date of Patent: Apr. 15, 2003

(54) GROUND EFFECT WING HAVING A VARIABLE SWEEP WINGLET

(75) Inventors: Zachary C. Hoisington, Long Beach, CA (US); Blaine K. Rawdon, San Pedro, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/157,502

(22) Filed: May 29, 2002

(51) Int. Cl.[7] ................................. B64C 3/38
(52) U.S. Cl. .................... 244/46; 244/47; 244/12.1; 244/23 R; 114/272
(58) Field of Search .................. 244/46, 47, 4 R, 244/12.1, 13, 23 R, 39; 114/272, 273

(56) References Cited

U.S. PATENT DOCUMENTS

| | | | |
|---|---|---|---|
| 4,457,479 A | 7/1984 | Daude | 244/203 |
| 4,674,709 A | 6/1987 | Welles | 244/45 R |
| 4,714,215 A | 12/1987 | Jupp et al. | 244/199 |
| 5,275,358 A | 1/1994 | Goldhammer et al. | 244/91 |
| 5,582,364 A | 12/1996 | Trulin et al. | 244/3.29 |
| 5,934,215 A | * 8/1999 | Burg | 114/273 |
| 5,988,563 A | 11/1999 | Allen | 244/49 |
| 6,199,496 B1 | 3/2001 | Burg | 114/67 A |
| 6,230,835 B1 | 5/2001 | Fischer et al. | 180/117 |

\* cited by examiner

*Primary Examiner*—J. Woodrow Eldred
(74) *Attorney, Agent, or Firm*—Alston & Bird LLP (57) ABSTRACT

A variable sweep winglet with a negative dihedral angle is provided for a ground effect vehicle. The winglet is positionable at a sweep angle to control the winglet tip clearance from ground. Variable winglet tip clearance reduces the risk of damage or instability due to collision with the ground or water, thereby permitting more efficient flight at lower altitude with an equivalent safety. The winglet is generally positioned by an actuator. The actuator is controlled by a flight control system, or by other manual or automatic systems. A sensor may also be included for determining whether an object lies in the path of the winglet. The sensor communicates with the flight control system in order to vary the sweep of the winglet to increase clearance from the ground or water, thus avoiding impact with the object.

21 Claims, 6 Drawing Sheets

GROUND EFFECT WING HAVING A VARIABLE SWEEP WINGLET

FIELD OF THE INVENTION

The present invention relates to winglets, and, more particularly, to a wing of a ground effect vehicle having a winglet with negative dihedral angle and variable sweep.

BACKGROUND OF THE INVENTION

Ground effect vehicles have been developed in both fields of aeronautics and marine craft. Ground effect vehicles are those vehicles which receive reduced drag due to the reduction of wing-tip vortices while traveling at low altitudes near ground, and more typically, near water. The closer the wing tip is to the ground or water, the lower the drag.

Ground effect vehicles generally comprise marine craft and aircraft. The two are typically distinguished by those that can sustain extended flight without the aid of ground effect (aircraft) and those that cannot (marine craft). The International Civil Aviation Organization (ICAO) and International Maritime Organization (IMO), both organizations of the United Nations, jointly exercise jurisdiction over these vehicles. The ICAO and IMO have also united to develop uniform navigation and safety rules for these types of vehicles, expected to be published by the year 2004.

The marine engineering arts have developed ground effect craft that either induce ground effect, such as hovercraft, or utilize some benefits of ground effect in combination with hydrodynamic hull and fin arrangements, such as catamarans and hydrofoils. Other maritime ground effect aircraft are being developed, and typically include ground effect wings to provide greater stability and lift. They cannot, however, sustain flight without maintaining close distance to the ground.

The aeronautical engineering arts have also advanced ground effect vehicles beginning with the Russian Ekranoplan KM, also known as the Caspian Sea Monster, which was developed in the 1960s for cargo transport and missile delivery applications. The KM uses extended wings with negative dihedral winglets on each end in order to promote the ground effect. The negative dihedral winglets are generally allowed to touch water if the KM is unintentionally flown too low. However, allowing the winglets to touch the water substantially increases drag, and may damage the wing or winglets. As such, the structural weight of the wing must be increased to account for water loads. If too much of the winglets contact water, the airplane may also experience stability problems.

It is typical for ground effect vehicles to travel within a few feet of the sea. In general, drag is reduced when the distance between the wingtip and the ground or water is reduced. in high wave conditions, altitude must be increased to avoid a collision between the wings or winglets and the water. Positive dihedral winglets on ground effect vehicles are effective in reducing drag, but not as effective as winglets that allow for decreased height between the lowest point on the wingtip to the water or ground. Additionally, ground effect vehicles with negative dihedral winglets may face the problem of winglet contact with the ground or water during landing and takeoff. As such, there exists a need in the art for ground effect vehicles with negative dihedral angles that can temporarily increase ground clearance or water clearance on the winglets, thus avoiding impact with the ground or water.

BRIEF SUMMARY OF THE INVENTION

To meet these and other needs, a ground effect vehicle and ground effect wing with a negative dihedral winglet are therefore provided. The ground effect wing includes a fixed wing capable of being attached to a ground effect vehicle fuselage. At the outward extension of the wing, a winglet is attached with a negative dihedral angle. The winglet is attached about a hinge or other mechanism so that it may rotate about a pivot axis. The pivot axis is generally defined at an angle that is roughly perpendicular to the direction of flight. This angle is also roughly normal to the plane of the winglet. The plane of the winglet is here defined by a flat surface between the leading and trailing edge of the winglet. In one such embodiment, the pivot axis is substantially perpendicular to the chord of the fixed wing. As such, the rotation of the winglet about the pivot axis results in variation of the winglet ground clearance through a range of sweep angles.

In several advantageous embodiments, an actuator is connected to the winglet in order to position the winglet through the range of sweep angles. Such actuators may include hydraulic actuators, springed actuators, rotating ballscrew actuators or other such actuators known to those skilled in the art. One advantageous embodiment includes an actuator with stored energy that may be activated in order to actuate the winglet through rotation about the pivot axis toward an aft sweep angle. A locking mechanism is included to lock the winglet in place against the stored energy actuator such that as the locking mechanism is unlocked the stored energy actuator automatically actuates the winglet through aft rotation. One embodiment of the locking mechanism includes a ratcheting mechanism. The ratcheting mechanism also permits rotation of the winglet about the pivot axis in order to change the sweep angle to avoid impact with an object such as the ground or water. Other embodiments for actuating the winglet through aft rotation include an aerodynamic device, such as a control surface or movable flap. The aerodynamic device is controlled to increase drag on the winglet such that the drag translates to rotational force about the pivot axis. Thus, the rotational force induces the winglet to position an aft sweep angle. In one embodiment, the rotational force caused by the drag is controlled by a locking mechanism. Thus, the winglet will increase sweep aft, thereby increasing clearance between the ground or water. As such, the winglet avoids contact with ground or water, consequently avoiding the stability problems or structural problems that would otherwise be caused from the impact.

Another advantageous embodiment of the present invention includes a ground effect vehicle comprising a fuselage and at least one ground effect wing. The ground effect wing is typically a wing with one end attached to the fuselage between the forward and aft portions of the fuselage and a winglet attached to the outer periphery of the second end of the fixed wing. The winglet is attached so as to form a negative dihedral angle and to be positionable through a range of sweep angles about a pivot axis, the pivot axis being defined at an angle with respect to the plane of the winglet. According to one embodiment, the pivot axis will be substantially perpendicular to the plane of the winglet. One embodiment of the ground effect vehicle includes actuators for actuating the winglet through the range of aft sweep angles. Such actuators may include hydraulic assisted actuators, spring assisted actuators or other actuating mechanisms known to those skilled in the art. Such actuators are generally controlled by flight control systems adapted to control the actuator and vary the sweep of the winglet to a desired position.

Several embodiments of the ground effect vehicle include sensors to determine whether an object lies in the path of the winglet. As such, the sensors are in communication with the flight control system to provide advance warning to the flight control system of an impending impact. Accordingly, the flight control system is adapted to vary the sweep of the winglet in order to increase the clearance from the ground or water to avoid impact. In certain embodiments, these sensors include forward looking sensors such as radar, laser, infrared, acoustic and imaging sensors. Another embodiment of the ground effect vehicle comprises physical sensors including an elongate member with a first end attached to the ground effect wing and second end extending downwardly therefrom. Such physical sensors are commonly known to those skilled in the art and referred to as "feelers." In either embodiment, a physical sensor or an electromagnetic sensor provides signals either to the flight control system or directly to the actuators on the winglet in order to immediately vary the sweep of the winglet in order to avoid impact with the sensed object.

Therefore, a ground effect vehicle with a ground effect wing having a variable sweep winglet advantageously permits increasing clearance of the winglet tip from ground or water by actuating the winglet to a further aft sweep. As such, control of the winglet can be maintained in order to avoid contact of the winglet with ground or water, thereby avoiding structural or stability problems. Consequently, the ground effect vehicle may advantageously maintain flight altitude for most efficient travel in ground effect.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
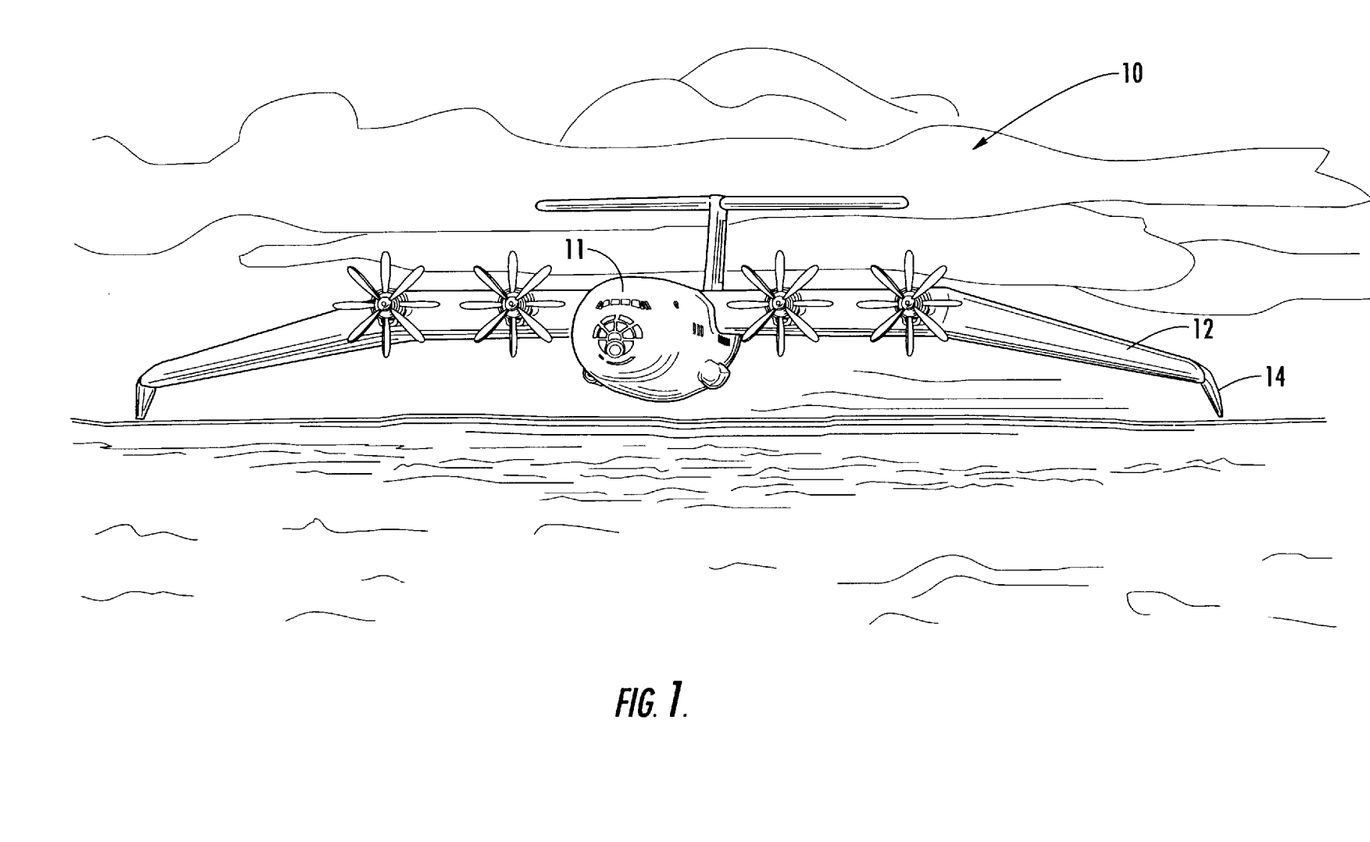
FIG. 1 is a perspective view of a ground effect vehicle with a variable sweep winglet according to one embodiment of the present invention.

FIG. 1 illustrates one embodiment of a ground effect vehicle 10 with a ground effect wing 12 having a variable sweep winglet 14. Ground effect vehicles generally comprise marine craft and aircraft. An inexact division between the two is made among those that can sustain extended flight without the aid of ground effect (aircraft) and those that cannot (marine craft). For purposes of illustration, the present invention is described in conjunction with a ground effect vehicle 10 generally regarded as an aircraft and illustrated in FIG. 1. Marine craft engineers, however, are continuing development of marine craft incorporating ground effect wings and winglets. Such marine craft may also benefit from utilization of the variable sweep winglet described herein. In particular, the ability to temporarily increase ground clearance between the winglet and the ground may improve performance in both types of vehicles. Therefore, the variable sweep winglet 14 can be employed in conjunction with other ground effect vehicles without departing from the spirit or scope of the present invention.

Figure 2:
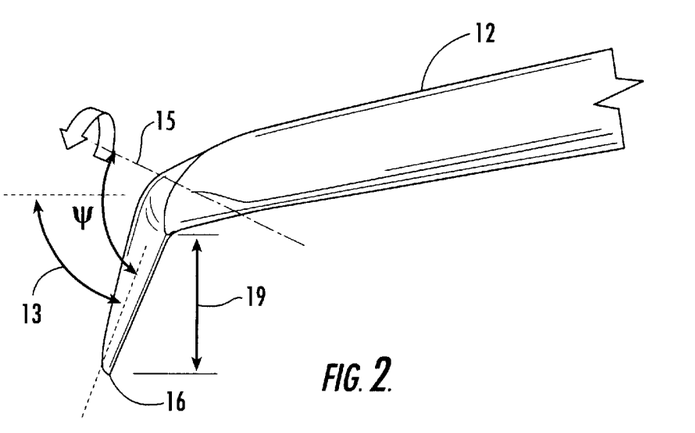
FIG. 2 is a front elevation view of a variable sweep winglet with a negative dihedral angle according to one embodiment of the present invention.
Figure 3:
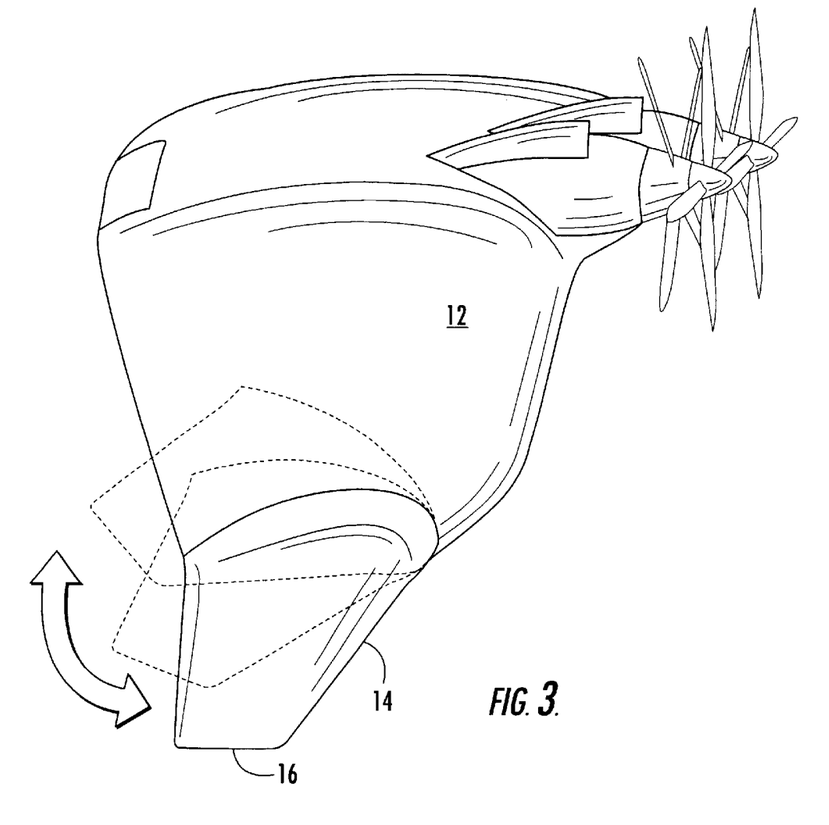
FIG. 3 is side elevation view illustrating three sweep positions of a variable sweep winglet according to one embodiment of the present invention.

Therefore, FIGS. 1 through 3 illustrate one exemplary embodiment of a variable sweep winglet 14 for a ground effect vehicle 10. A fixed ground effect wing 12 is attached to a fuselage 11, as commonly found on ground effect vehicles. At the outermost extremity of the fixed wing 12 is a winglet 14. The winglet 14 has a negative dihedral angle 13 in order to reduce drag during ground effect flight. As described herein, dihedral angle refers to the inclination of the winglet 14 with respect to a horizontal plane, and a negative dihedral angle is a downward inclination. In general, winglets are designed to achieve certain aerodynamic properties according to design parameters, such as camber, chord length, span, etc., and such design criteria are well known to those skilled in the art. More particularly, design criteria vary according to specific parameters of the fixed wing 12, fuselage 11, and control surfaces of various ground effect vehicles to which the variable sweep winglet 14 may be applied. As a result of such variability, specific winglet design parameters are not discussed herein, however, the variable sweep winglet 14 of the present invention is capable of implementation with many different designs, as will be appreciated by one skilled in the art.

The winglet 14 is rotatably attached to the wing by way of a pivoting device, such as a hinge 28. The pivot axis 15 of the pivoting device is oriented at an angle of intersection, $\psi$, FIG. 2, to the plane of the winglet such that rotation of the winglet changes the distance of the tip of the winglet from the ground. The pivot axis is also oriented at an angle, $\theta$, FIG. 4, to the chord of the wing. Accordingly, the winglet 14 is rotatable about the pivot axis 15 such that the sweep angle of the winglet 14 varies corresponding to rotation. As used herein, sweep angle refers to the fore and aft angle that the winglet 14 rotates about the pivot axis 15. Zero degrees sweep, no sweep, and nominal position all refer to the typical flying position of the winglet 14. According to one embodiment of the variable sweep winglet 14, the angles $\psi$ and $\theta$ may advantageously be substantially perpendicular angles, which is within at least a range of angles about and including a perpendicular angle.

The winglet sweep angle is varied through rotation about a pivot axis 15. As the winglet 14 rotates to a sweep angle further aft, it is a characteristic of the negative dihedral winglet 14 to move further away from the ground. The furthermost position of the winglet tip 16 from the ground, as depicted at 19 in FIG. 2, occurs at a full aft sweep angle. In the nominal position, which is the position most conducive to ground effect, the winglet tip 16 is nearest the ground and the winglet sweep angle is least. As such, the variation of sweep advantageously provides increased ground clearance to the winglet tip 16 for a constant altitude of the fuselage 11. FIG. 2 illustrates the maximum possible change in clearance 19 from the ground between nominal position and the full aft position, which would place the leading edge of the winglet substantially even with the lowest edge of the fixed wing 12. By selectively controlling the sweep angle, the ground effect vehicle 10 may conserve altitude while avoiding winglet 14 contact with the ground, thereby maintaining efficiency of flight.

Figure 4:
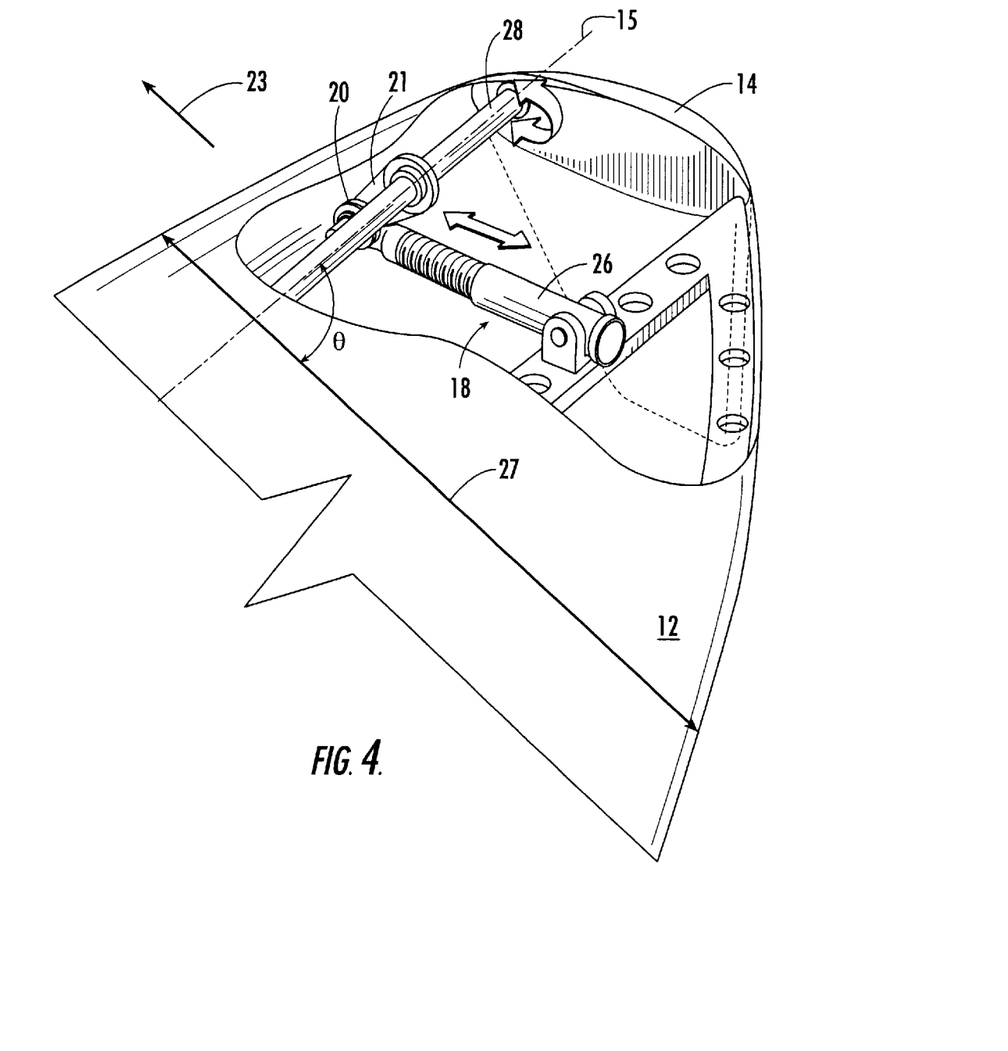
FIG. 4 is a perspective sectional view of a variable sweep winglet with an actuator according to one embodiment of the present invention.

FIG. 4 is a cross-sectional schematic of one advantageous embodiment of the variable sweep winglet 14 referencing the direction of flight 23. FIG. 4 illustrates one configuration of an actuator 18, in this case a hydraulic actuator, for rotating the winglet 14 about the pivot axis 15. The actuator 18 is attached to the fixed wing 12 and pivotably attached to the winglet 14 by way of a hinge 28. In this embodiment, the actuator 18 comprises a hydraulic housing 26 and an extendable rod 24, the extendable rod 24 being pivotably attached to the winglet 14 by means of a rotating joint 20 and lever 21 via the hinge 28. The housing 26 typically contains the operation controls for extending the rod 24 and position for providing feedback to a controller. Numerous actuators of a similar nature operate using a variety of controls including hydraulic movement, electric motor movement, springed motors, transfer of motion by ballscrew, etc. and may be substituted accordingly. Generally, these will be generally custom produced according to specifications and requirements for loading, torque, moment, extension, etc. As will become apparent to one skilled in the art, many other configurations of actuators may be employed with the variable sweep winglet described herein.

The extendable rod 24 connects by way of a rotating joint 20, lever 21, and hinge 28 to the winglet 14 to allow rotational motion about the rotating joint 20 in order to transfer lateral motion of the extendable rod 24 to rotational motion of the winglet 14 about the hinge 28, the longitudinal axis of the hinge 28 corresponding to the pivot axis 15. Therefore, as the actuator 18 varies the winglet 14 to a further aft sweep the winglet tip 16 necessarily increases its clearance from the ground or water. The actuator 18 is typically controlled by a flight control computer or other manual or automatic control systems generally known to those skilled in the art. Accordingly, the actuator 18 is adapted to be responsive to the flight control computer to selectively position the winglet 14 to a desired sweep angle and ground clearance.

Additional embodiments of the actuator 18 include a stored energy actuator. Such stored energy actuators include springed energy storage, hydraulic stored energy, and other stored mechanical energy sources capable of immediately releasing stored mechanical energy to actuate the wing. In one particular embodiment, it is desirable use the stored energy actuator to position the winglet 14 to an aft position thus increasing winglet tip 16 clearance from the ground. Such stored energy actuators are advantageous when rapid response is required to elevate the winglet 14 out of way of impact with the ground or water. In this embodiment, the actuator may be actuated upon command from the flight control system, another control system of the ground effect vehicle 10, or manually via a control system.

Figure 5:
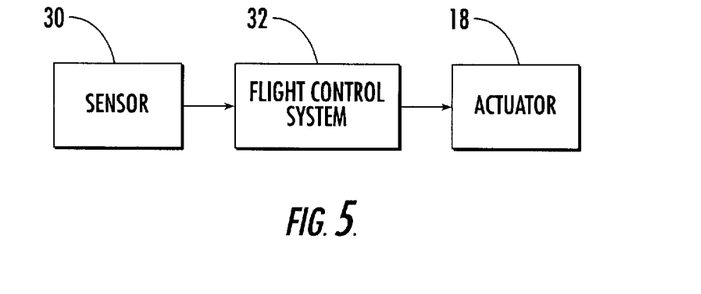
FIG. 5 is a flow diagram of a system for controlling a variable sweep winglet according to one embodiment of the present invention.

Another advantageous embodiment of the variable sweep winglet includes a system for sensing objects, such as ground or water, that lie within the path of the variable sweep winglet 14 and position the winglet 14 in order to increase winglet tip 16 clearance from the ground or water. FIG. 5 illustrates a block diagram of a sensor 30 in communication with a flight control system 32, which controls the actuator 18 to vary the sweep of the winglet 14. The flight control system 32 generally comprises a flight control computer and related equipment, however, control systems are well known to those skilled in the art and may be substituted accordingly. By way of example, as the ground effect vehicle 10 travels above waves on a sea, large waves have the potential to strike the winglet 14. These waves are sensed by the sensor 30, and indication is therefore provided to the flight control system 32. The flight control system 32 determines whether the wave lies in the path of the winglet 14, and accordingly controls the actuator 18 to position the winglet 14 to a further aft sweep angle in order to increase the clearance of the winglet tip 16 from the wave and avoid impact with the wave. Therefore, the altitude of the fuselage 11 does not require change to avoid winglet tip 16 impact with the wave. Similarly, one embodiment permits the sensor 30 and flight control system to determine whether the path of the winglet is clear. Accordingly, winglet 14 may be returned to the nominal sweep angle once the control system repositions the winglet 14 to the nominal position.

Figure 6:
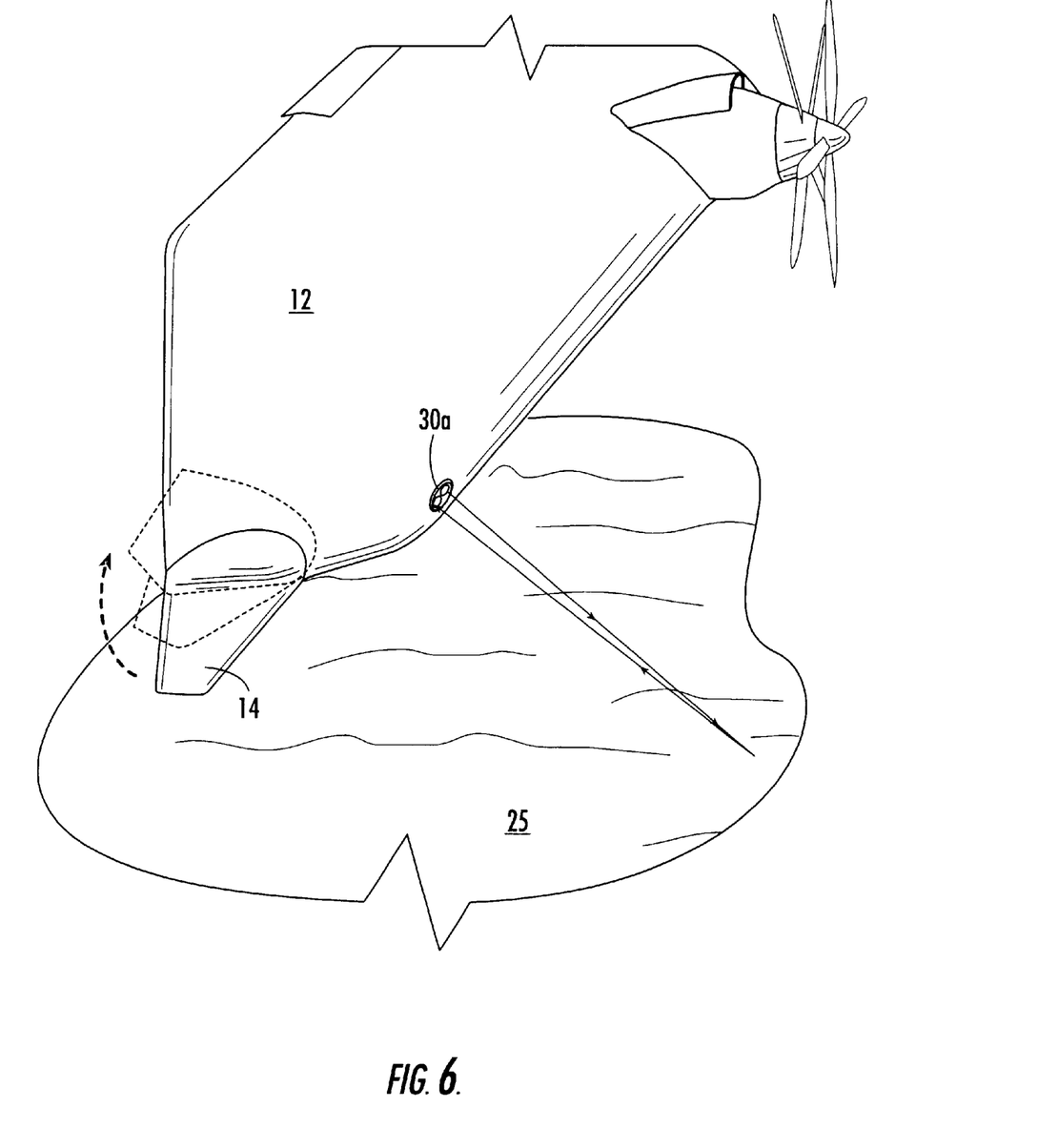
FIG. 6 is a perspective view of a variable sweep winglet with an electromagnetic sensor according to one embodiment of the present invention.

FIG. 6 depicts one embodiment of the sensor 30, a forward looking sensor 30a positioned on the fixed wing 12. Forward looking sensors are well known to those skilled in the art and generally include active and passive sensors such as laser, infrared, radar, acoustic, and imaging sensors, among others. For example, an active forward looking sensor 30 includes a signal transmitter for producing a forward looking signals, such as an electromagnetic signal or acoustic signal, to be reflected from the object that lies within the path of the winglet 14, such as water 25. The sensor 30 also includes a receiver for receiving the reflected signal and providing an indication to the flight control system 32. Generally, the object's range and azimuth from the winglet are available from the sensor or may be calculated by the flight control system 32 using algorithms known to those skilled in the art, such as doppler, beam steering, arraying techniques, etc. Alternatively, a passive forward looking sensor may also be used. For example, an imaging device may receive naturally reflected light and use ray optic and image analysis techniques to determine range. Active and passive sensors such as these are known to those skilled in the art and commercially available examples include altimeters, range finders, motion detectors, etc.

Figure 8:
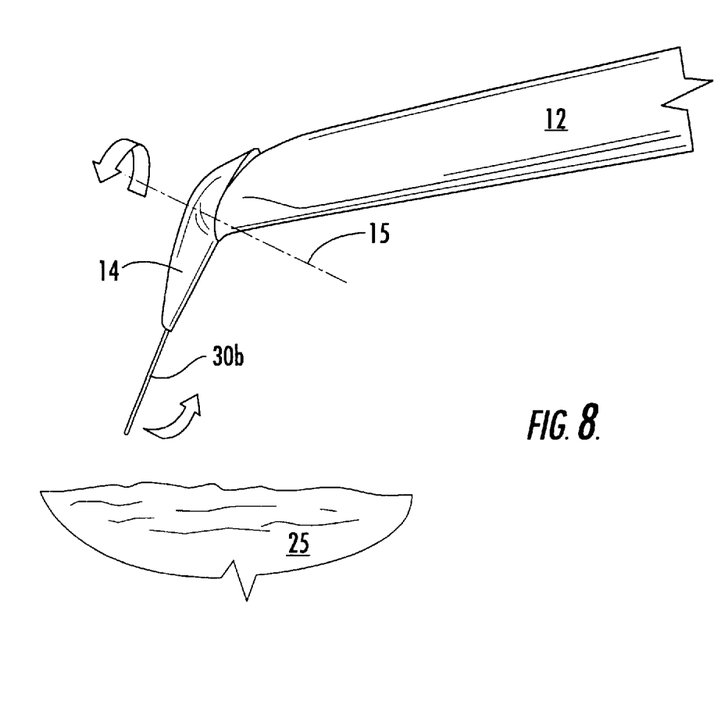

From the detection provided by the sensor, the flight control system 32 determines whether the ground or water 25 lies in the path of the winglet 14. If so, the flight control system 32 selectively controls the actuator 18 to vary the variable sweep winglet 14 to a sweep angle sufficient to increase the clearance of the winglet tip 16 from the ground or water 25 and thus avoid, or at least reduce or minimize, impact. The embodiment illustrated in FIG. 8 depicts the electromagnetic sensor 30a located on the fixed wing 12 nearest the winglet 14, however, the forward looking sensor 30a may be positioned anywhere that it is capable of sensing whether ground, water, or another object lies in the path of the winglet. These locations include the winglet 14 itself, the fuselage 11, or other outer surfaces of the ground effect vehicle 10.

Figure 7:
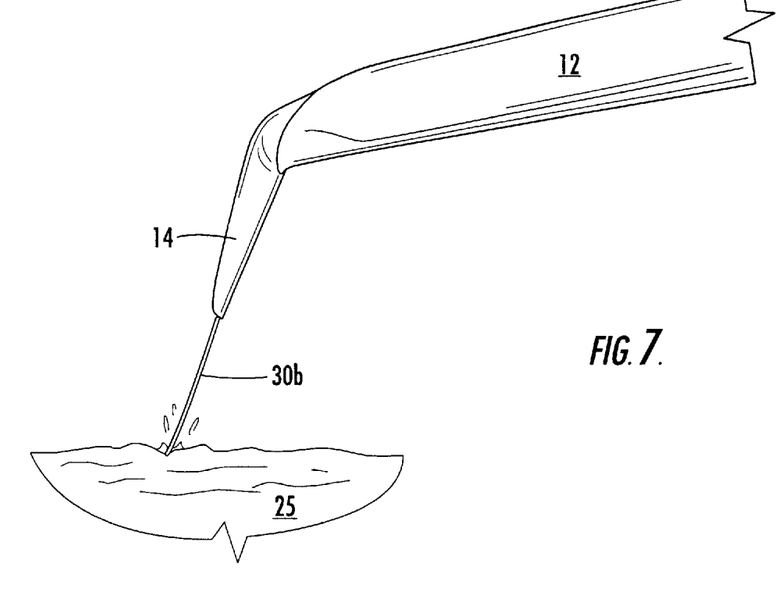
FIGS. 7 and 8 are front elevation views of a variable sweep winglet with a feeler according to one embodiment of the present invention.

Referring now to FIGS. 7 and 8, another embodiment of the sensor 30 includes a mechanical sensor 30b, such as a feeler, to detect impending contact with the ground or water 25. As such, the mechanical sensor 30b extends downwardly from the winglet 14, or alternatively from another portion of the wing 12 or fuselage 11, and provides mechanical indication that the winglet 14 may strike ground or water 25. Upon contact with the water, the mechanical sensor 30b produces a corresponding mechanical distortion. For example, the mechanical sensor 30b may be attached to a strain gauge or similar mechanical distortion measuring devices known to those skilled in the art. The mechanical indication is then converted to an electrical signal and provided to the flight control system 32. Mechanical to electrical converters are well known to those skilled in the art and include resistive strain gauges, magnetic displacement devices, capacitive displacement devices, etc. Upon receiving indication of impact from the mechanical sensor 30b, the flight control system 32 actuates the winglet 14 to a further aft sweep angle to increase the clearance from ground of the winglet tip 16 and thus avoiding impact of the winglet 14 with the ground or water 25. Furthermore, the mechanical sensor 30b may be employed in conjunction with any of the other embodiments described herein.

In another embodiment, the mechanical sensor 30b mechanically communicates with the actuator 18, such as an embodiment of the stored energy actuator described above. As such, the mechanical sensor may be linked to a trigger for releasing stored energy to actuate the winglet 14 to an aft sweep angle. Additionally, a locking mechanism, such as a ratchet pawl and gear, locks the winglet 14 in position about the pivot axis 15. The stored energy actuator 18 is adapted to provide actuation of the winglet 14 about the pivot axis 15 toward an aft sweep angle upon the locking device becoming unlocked. As such, the sensor provides an indication of impending impact and mechanically triggers the locking mechanism to allow the winglet 14 to achieve a further aft sweep angle thus increasing winglet tip 16 clearance from the ground or water.

Figure 9:
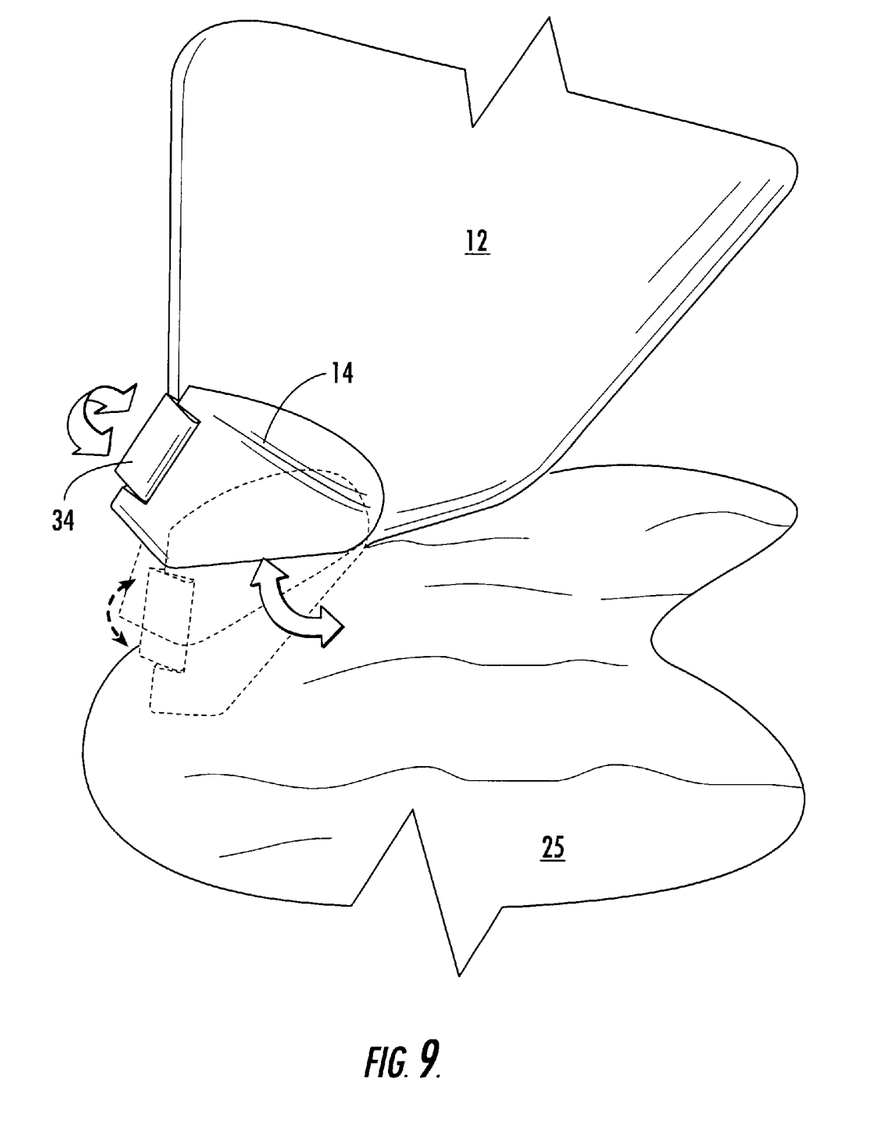
FIG. 9 is a perspective view of a variable sweep winglet with a movable flap according to one embodiment of the present invention.

Another advantageous embodiment of the variable sweep winglet 14 includes an aerodynamic device, such as a movable flap 34 illustrated in FIG. 9, attached to the winglet 14. As such, the movable flap 34 may be positioned to increase the drag forces on the winglet 14, and the drag force translates to rotational moment about the pivot axis 15. In one advantageous embodiment, a locking mechanism, such as a ratchet pawl and gear or the like, provides pivotal resistance to the aerodynamic rotational forces, if any, and locks the winglet at the nominal sweep angle. The locking mechanism includes an unlocking set point, which is a predetermined rotational force required to unlock and actuate the stored energy actuator to rotate the winglet aft. As the flap 34 is repositioned, the drag forces, and thus rotational forces increase. The locking mechanism unlocks and the increased drag rotates the winglet 14 aft about the pivot axis 15. The locking mechanism then locks the winglet 14 to the new sweep angle. As illustrated in FIG. 8, the movable flap 34 may advantageously be provided on a trailing edge of the winglet 14. The flap 34 may be controlled by the flight control system, such as the flight control computer or the like. Furthermore, movable flap 34 may be employed in conjunction with any of the other embodiments described herein as a supplemental system to vary the sweep of the winglet 14.

In yet another embodiment, the winglet 14 is constructed to withstand momentary impact with the ground or water and then translate the force of momentary impact to rotational force about the pivot axis 15. This momentary impact force may come from an impact on the winglet or feeler 30b. As such, a locking mechanism, such as a ratchet pawl and gear, locks the winglet 14 into the nominal sweep angle. The locking mechanism includes an unlocking set point, which is a predetermined rotational force required to unlock and actuate the stored energy actuator to rotate the winglet 14 aft. As the winglet 14 positions to an aft sweep position, the winglet tip 16 increases clearance from the ground or water. Therefore, the winglet 14 or feeler 30b only sustains a temporary impact with the ground or water and limits the instability and structural damage caused by the impact.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ground effect wing, comprising:
   a fixed wing capable of being attached on a first end to a vehicle fuselage; and
   a winglet attached to a second end of said fixed wing such that the winglet has a negative dihedral angle with respect to said fixed wing, wherein said winglet is positionable through a range of sweep angles corresponding to rotation about a pivot axis, the pivot axis being defined at an angle to the plane of the winglet wherein rotation about the pivot axis causes a change in ground clearance of the winglet.

2. The ground effect wing according to claim 1, wherein winglet is positionable corresponding to the pivot axis defined at an angle substantially perpendicular to the plane of the winglet.

3. The ground effect wing according to claim 1, further comprising an actuator connected to said winglet to position the winglet through the range of sweep angles.

4. The ground effect wing according to claim 1, further comprising a locking mechanism connected between said winglet and said fixed wing, said locking mechanism capable of locking the winglet at a plurality of sweep angles.

5. The ground effect wing according to claim 4, further comprising a stored energy actuator adapted to provide force to actuate the winglet through rotation about the pivot axis toward an aft sweep angle when the locking mechanism is unlocked.

6. The ground effect wing according to claim 4, further comprising an aerodynamic device adapted to direct fluid flow about the winglet such that the fluid flow increases drag force against the winglet and the increased drag force actuates the winglet through rotation about the pivot axis toward an aft sweep angle when the locking mechanism is unlocked.

7. The ground effect wing according to claim 6, wherein said aerodynamic device includes a movable flap.

8. The ground effect wing according to claim 4, wherein said locking device includes a ratcheting mechanism gear to permit winglet rotation about the pivot axis toward an aft sweep angle upon impact with an object in the path of the winglet and to lock to the winglet in the aft sweep angle position after the impact.

9. A ground effect vehicle, comprising:
   a fuselage having a forward portion and an aft portion; and
   at least one ground effect wing, comprising:

a fixed wing attached on a first end to said fuselage between the forward portion and the aft portion; and a winglet attached to a second end of said fixed wing such that the winglet has a negative dihedral angle with respect to said fixed wing, wherein said winglet is positionable through a range of sweep angles corresponding to rotation about a pivot axis, the pivot axis being defined at an angle to the plane of the winglet wherein rotation about the pivot axis causes a change in ground clearance of the winglet.

10. The ground effect vehicle according to claim 9, the ground effect wing further comprising an actuator connected to said winglet to position the winglet through the range of sweep angles.

11. The ground effect vehicle according to claim 10, further comprising a flight control system, wherein said actuator is responsive to said flight control system and said flight control system is adapted to control the actuator to vary the sweep of the winglet.

12. The ground effect vehicle according to claim 11, further comprising a sensor for determining whether an object lies relative to the path of the winglet, wherein said sensor is in communication with the flight control system.

13. The ground effect vehicle according to claim 12, wherein said sensor comprises a forward looking sensor.

14. The ground effect vehicle according to claim 12, wherein said sensor comprises a physical sensor including an elongate member with a first end attached to the ground effect vehicle and a second end extending downwardly therefrom.

15. The ground effect vehicle according to claim 12, wherein the flight control system automatically varies the sweep of said winglet based upon the sensor to avoid physical contact of the winglet with the object.

16. The ground effect vehicle according to claim 9, the ground effect wing further comprising a locking mechanism connected between said winglet and said fixed wing, said locking mechanism capable of locking the winglet at a plurality of sweep angles.

17. The ground effect vehicle according to claim 16, the ground effect wing further comprising a stored energy actuator adapted to provide force to actuate the winglet through rotation about the pivot axis toward an aft sweep angle when the locking mechanism is unlocked.

18. The ground effect vehicle according to claim 16, the ground effect wing further comprising an aerodynamic device adapted to direct fluid flow about the winglet such that the fluid flow increases drag force against the winglet and the increased drag force actuates the winglet through rotation about the pivot axis toward an aft sweep angle when the locking mechanism is unlocked.

19. The ground effect vehicle according to claim 18, wherein said aerodynamic device includes a movable flap.

20. The ground effect vehicle according to claim 19, further comprising a flight control system wherein said movable flap is adapted to be responsive to the flight control system and is positionable by the flight control system to vary the drag force such that the winglet is positioned to a particular sweep angle.

21. The ground effect vehicle according to claim 16, wherein said locking device includes a ratcheting mechanism to permit winglet rotation about the pivot axis toward an aft sweep angle upon impact with an object in the path of the winglet and to lock to the winglet in the aft sweep angle position after the impact.

* * * * *